United States Patent [19]

Bronnert

[11] Patent Number: 4,817,994
[45] Date of Patent: Apr. 4, 1989

[54] ASEPTIC PIPE JOINT

[76] Inventor: Hervé X. Bronnert, 21495 Partridge Ct., Brookfield, Wis. 53005

[21] Appl. No.: 108,472

[22] Filed: Oct. 14, 1987

[51] Int. Cl.⁴ .............................................. F16L 35/00
[52] U.S. Cl. ........................................ 285/93; 285/14; 285/349; 285/351; 285/354; 285/365; 285/901; 285/917; 285/923; 285/286; 277/235 R; 138/89
[58] Field of Search ................. 285/365, 367, 917, 93, 285/918, 901, 336, 923, 349, 286, 351, 14, 354; 277/228, 229, 234, 235 R; 138/89

[56] References Cited

U.S. PATENT DOCUMENTS

| | | | |
|---|---|---|---|
| 2,761,707 | 9/1956 | Herman | 285/367 |
| 3,285,631 | 11/1966 | Stolpmann | 285/918 |
| 3,687,494 | 8/1972 | Graff | 285/917 X |
| 3,794,361 | 2/1974 | Westberg | 285/367 X |
| 3,797,836 | 3/1974 | Halling | 285/367 |
| 4,261,584 | 4/1981 | Browne et al. | 277/235 R X |
| 4,407,533 | 10/1983 | Giebeler | 285/349 X |

FOREIGN PATENT DOCUMENTS

| | | | |
|---|---|---|---|
| 2239314 | 2/1974 | Fed. Rep. of Germany | 285/351 |
| 657730 | 11/1963 | Italy | 285/918 |
| 840220 | 7/1960 | United Kingdom | 285/918 |

Primary Examiner—Dave W. Arola
Attorney, Agent, or Firm—Ronald E. Barry

[57] ABSTRACT

An aseptic pipe joint for food processing pipe fittings of the type including a pair of frustoconical ferrules having radially extending surfaces, a "C" shaped metallic ring positioned between the surfaces in abutting relation therewith, a resilient O-ring filling the "C" shaped ring to form an aseptic seal, a resilient seal ring positioned between the ferrule surfaces and spaced radially outwardly from the "C" shaped ring forming a hermetic zone between the seals and a passage in one of the ferrules connected to the hermetic zone for testing the aseptic seal.

6 Claims, 1 Drawing Sheet

ASEPTIC PIPE JOINT

BACKGROUND OF THE INVENTION

1. Field of the Invention

The present invention relates to pipe fittings and joints for food processing and other applications where sanitary and aseptic conditions are required. Processing of foods and other products such as pharmaceuticals, requires appropriate handling and precautions to prevent contamination of the product and to provide sanitary equipment. One area in food processing equipment which is particularly susceptible to the entry of contaminants is pipe joints where fittings are used to couple tube or pipe sections.

2. Description of Related Art

In the past, pipe and tube fittings for sanitary and aseptic processing have utilized pipe joints sealed by convential O-rings or gaskets in which two or more O-ring or gasket seals or a combination of them are typically provided to form a barrier between products passing through the piping and the exterior of the fitting joint. To further guard against contaminants, steam seals have been provided at the joints basically consisting of a surrounding annular steam filled chamber around the joint. Necessary inlet and outlet steam piping is also required. A major disadvantage of the use of steam seals in some applications is that certain products are susceptible to the effects of heat which may adversely affect certain food products and their end quality. Furthermore, steam is costly in that it requires a source of steam, piping of steam to and from the individual joints and their efficiency is often affected by the build-up of scale deposits from the steam itself in the joints. In addition, conventional O-rings in aseptic processing require high quality surface finishes at the seal joint. Lastly, even the best O-rings are still susceptible to some passage of contaminants such as bacteria, as well as the trapping and build-up of product at the O-ring.

SUMMARY OF THE INVENTION

A principal feature of the invention is the provision for the first time of an aseptic-sanitary joint which when used throughout a system piping can allow pretesting of the entire system with vacuum/helium techniques. This provides a further saving in product since it does not have to be used to make initial testings.

A principal advantage of the invention is the ability to detect before startup on a product, the exact location of a leak and the size of the leak. The leak can then be attended to quickly before a final product test. The same procedure can be done at any time thereafter to check the system's integrity.

A further feature of the invention is a pipe joint for sanitary and aseptic processing applications in which the primary seal is a metallic ring having a "C"-shaped cross section and containing a rubber or plastic O-ring material within it to provide an aseptic sanitary joint.

A further feature is the provision of a secondary conventional O-ring seal spaced outwardly from the primary seal to form a hermetic zone in the joint between the two seals.

A further feature is the provision of both a compression seal of the two seal rings, as well as metal to metal contact between the "C"-shaped ring and the fittings. A test port may be provided for testing the quality of the seal by monitoring the passage of helium or other gas within the hermetic zone in the joint between the two seals.

Other principal features and advantages of this invention will become apparent to those skilled in the art upon review of description, claims and drawings.

Figure 1:
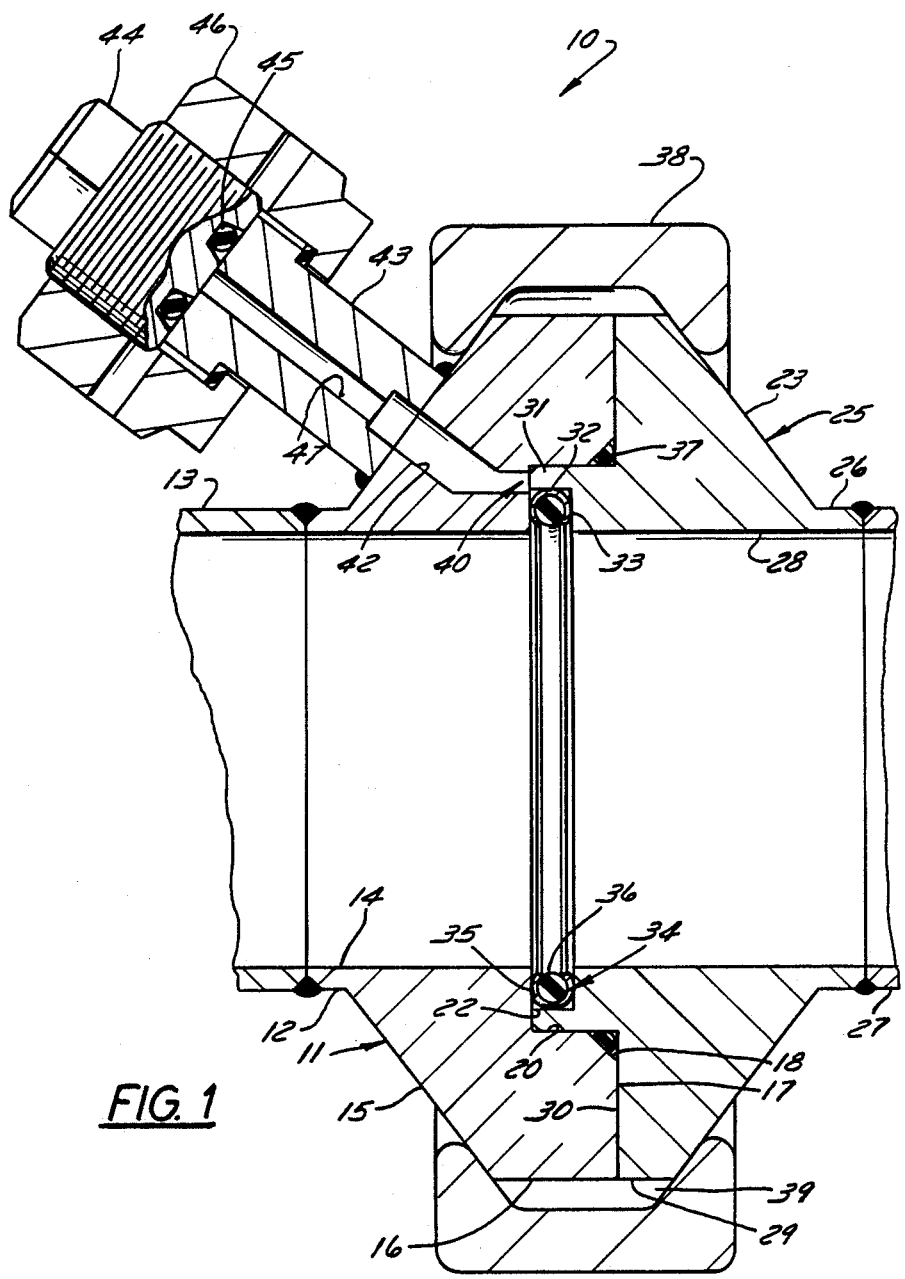
FIG. 1 is a cross sectional view of an aseptic pipe joint assembly according to the invention.

Before one embodiment of the invention is explained in detail, it is to be understood that the invention is not limited in its application to the details of construction and the arrangements of components set forth in the following description or illustrated in the drawing. The invention is capable of other embodiments and of being practiced or being carried out in various ways. Also, it is to be understood that the phraseology and terminology used herein is for the purpose of description and should not be regarded as limiting.

DESCRIPTION OF THE INVENTION

Referring to FIG. 1, the aseptic pipe joint assembly 10 includes a first or female ferrule 11 having a tubular extension 12 which is attached to a tube or pipe 13 in any conventional manner such as by welding. The ferrule 11 includes an internal bore 14 aligned with the interior of tube 13. Ferrule 11 also has a frusto-conical shaped outer surface 15 extending outwardly by and axially away from extension 12 and ending at a circular section 16 having a flat radial end surface 30. The end surface 17 of the ferrule 11 has a frusto-conical counter-bore 18 which terminates at an internally counter-bored portion 20 extending axially inward to a radial seal surface 22.

A second or male ferrule 25 also has a tubular extension 26 which may be attached to a second tube or pipe 27 in any conventional manner and the ferrule 25 also has an internal bore 28 aligned with the interior of tube 27. The male ferrule 25 also has a frusto-conical exterior surface 23 extending outwardly and axially toward the female ferrule 11 and ending at a circular section 29 having a flat radial end surface 30. The end of male ferrule 25 also has a cylindrical protuberant end 31 which is sized to fit within the counter-bore 20 of female ferrule 11. The protuberant end 31 of ferrule 25 also has an internal counter-bore 32 forming a radial seal surface 33 parallel to the seal surface 22.

As a first or primary seal in the assembly 20, a "C" ring assembly 34 is provided which consists of a metallic ring 35 having a "C"-shaped cross section into which is inserted a compressible O-ring 36. The "C" ring is positioned in the counterbore 32 and engages the seal surface 33. When the male ferrule 25 is inserted into the female ferrule 11 as shown in the drawing, the "C" ring assembly 34 will be squeezed between surfaces 22 and 33.

In this regard, the dimensions of "C" ring assembly 34, and the depth of the counter-bore 32 are sized so that a seal is formed when male ferrule 25 is inserted into the female ferrule 11 just enough for the end of the protuberant end 31 to contact seal surface 22 and thereby compress the "C" ring assembly 34. As seen in the drawing, a seal is formed at the contact points between the "C" ring assembly 34 and seal surfaces 22 and 33. Additionally, compression of the metallic "C" ring 35 will press its interior surfaces into intimate sealing contact with the compressible O-ring 36. This effectively forms a tight contact which prevents the accumulation of product within the "C" ring and meets governmental sanitary standards for the handling of food products. A secondary seal is provided by means of an O-ring 37 which is placed between the radial surface 30 of male ferrule 25 and the frusto-conical bore 18 of the female ferrule 11. The ferrules 11 and 25 are closed by means of a "V" clamp member 38 which engages the frusto-conical surfaces 15 and 23 of the ferrules 11 and 25, respectively. A gap 39 is provided between the radial surface 29 of male ferrule 25 and the radial surface 16 of female ferrule 11 when the clamp is mounted on the ferrules. Tightening of the "V" clamp, whose details are not described as they are well known in the art, will clamp the ferrules 11 and 25 together and compress the "C" ring assembly 34, as well as compressing the O-ring 36 and the O-ring 37 to seal the joint. There will thus exist a hermetic zone 40 which extends between the "C" ring assembly 34 and the O-ring 37 in the joint between the two ferrules 11 and 25.

The hermetic zone 40 may be tested by providing a test port fitting 43 or a single hole 40-42 in ferrule 11 terminating at the hermetic zone 40. A test fitting 43 having a bore 47 is attached to the ferrule 11 with the bore 47 aligned with the other end of the bore 42. When not in use, the test fitting 43 may be sealed by means of a plug 44 and O-ring 45 as shown in the drawing with the plug secured by a nut 46.

In the typical aseptic food processing application, the tubing 13 and 27 are typically formed from stainless steel as may be the ferrules 11 and 25. The "C" ring assembly 34 utilizes a "C" ring 35 which is plated with a noncorrosive ductile material which is preferably but not limited to pure nickel, gold or teflon, or the "C" ring may be constructed of pure nickel entirely. A preferred material for the O-rings 36 and 37 is Viton or EPDM, however, other suitable O-ring materials would suffice as long as they are compatible with the environment which they will be exposed to. Nickel or other metal of similar characteristics is preferred for the "C" ring material due to its compatibility with all types of food products and inertness to chemical compounds found in water or cleaning solutions. Additionally, nickel being a relatively soft and ductile metal, deforms to form a molecular seal at the surfaces 22 and 33 which is virtually absolute and prevents the passage of the most minute forms of bacteria or other undesirable contaminants such as bacterial spores, yeast, mold or other similar contaminants. Furthermore, a positive seal is provided both for high vacuums reaching $1 \times 10$ at the power of 12 tons and for high pressures of over 15,000 psig. The "C" ring assembly 34 will function effectively over a large temperature range from cryogenic conditions to 500 degrees Fahrenheit. By filling the inside of the "C" ring 35 with the O-ring 36 before assembly of the joint, accumulations of product are avoided thereby meeting U.S. sanitary standards.

The entire assembly may be sterilized by the application of high temperature water or steam flowing through internal bore 14 and bore 28 radiating heat to the assembly. The location of seals 36-34 and 37 is such that radiating heat, conducted by the metal of each ferrule, goes around them and their adjacent surfaces providing a total sterilization.

The quality of the joint seal may be tested by means of the test port fitting 43 mounted on ferrule 11. A preferred test is to utilize helium gas which may be introduced into the tubing 13 and 27 under pressure. A vacuum pump may then be coupled to the test fitting 43 and conventional helium detecting equipment used to monitor the outlet of the vacuum pump. Any helium molecules migrating past the seal assembly 34 into the hermetic zone 40 would thus be drawn by the vacuum pump through test fitting 43 and detected. A reverse test may also be utilized whereby pressurized helium is applied to the test fitting and a vacuum pump attached to some portion of the product tubing 13 or 27 with the presence of helium again being monitored.

An advantage of the present invention is that the sealing action of the "C" ring assembly 34, by virtue of utilizing a softer metal such as nickel, gold or teflon, will not indent or upset the stainless steel surfaces of the ferrules 11 and 25, thus permitting repeated opening and closing of the assembly without the necessity of changing the fitting or seal. Furthermore, compression of the ring 35 into intimate contact with O-ring 36 provides a sanitary seal.

While a preferred embodiment of the invention has thus been described, those skilled in the art will appreciate the fact that other variations will be possible without departing from the inventive concept. Accordingly, the scope of the invention is to be taken solely from an interpretation of the claims which follow.

The embodiments of the invention in which an exclusive property or privilege is claimed we defined as follow:

1. An aseptic pipe joint comprising a first ferrule having a counter-bore with a sealing surface therein, a second ferrule having a protuberant end adapted to be matingly received in said counter-bore, a counter-bore in said protuberant end of said second ferrule with a sealing surface therein, means in said counter-bore in said second ferrule for engaging said sealing surfaces and sealing the joint between said ferrules,
   said sealing means including a "C"-shaped metallic ring and a resilient seal ring filling the inside of said "C"-shaped ring to prevent the accumulation of product in the metallic ring and means for holding the joint together.

2. The pipe joint according to claim 1, including a second means for sealing said joint spaced radially outward from said "C"-shaped metallic ring to form a hermetic zone in said joint between said seal means and said ring.

3. The pipe joint according to claim 2, including a test port in one of said ferrules connected to said hermetic zone in said joint whereby said seal can be tested for leaks.

4. The aseptic seal ring according to claim 1 wherein said "C"-shaped ring is formed of a soft and corrosion-resistant material.

5. The aseptic ring according to claim 1 wherein said "C"-shaped ring is formed from a metallic material having a coating of ductile, noncorrosive material.

6. The aseptic ring according to claim 1 wherein said resilient seal ring is in the form of an O-ring seal.

* * * * *